US 12,190,056 B1

United States Patent
Verma

(10) Patent No.: US 12,190,056 B1
(45) Date of Patent: Jan. 7, 2025

(54) AI SUPPORTED UI FORM TEXT FIELD AUTOCORRECTING ITS VALUE FROM A LIVE CONVERSATION

(71) Applicant: Bank of America Corporation, Charlotte, NC (US)

(72) Inventor: Sandeep Verma, Gurugram (IN)

(73) Assignee: Bank of America Corporation, Charlotte, NC (US)

( * ) Notice: Subject to any disclaimer, the term of this patent is extended or adjusted under 35 U.S.C. 154(b) by 48 days.

(21) Appl. No.: 18/228,731

(22) Filed: Aug. 1, 2023

(51) Int. Cl.
  *G06F 3/16* (2006.01)
  *G02B 27/01* (2006.01)
  *G06F 40/232* (2020.01)

(52) U.S. Cl.
  CPC ......... *G06F 40/232* (2020.01); *G02B 27/017* (2013.01); *G06F 3/167* (2013.01); *G02B 2027/0178* (2013.01)

(58) Field of Classification Search
  CPC ..... G06F 40/232; G06F 3/167; G02B 27/017; G02B 2027/0178
  See application file for complete search history.

(56) References Cited

U.S. PATENT DOCUMENTS

| | | | |
|---|---|---|---|
| 10,515,144 B2 | 12/2019 | Jitkoff et al. | |
| 10,708,424 B1* | 7/2020 | Maestas | H04M 3/5141 |
| 2002/0065656 A1* | 5/2002 | Reding | G10L 15/30 |
| | | | 704/E15.047 |
| 2019/0188251 A1* | 6/2019 | Liu | G06F 40/274 |

FOREIGN PATENT DOCUMENTS

| | | |
|---|---|---|
| AU | 2016253705 | 7/2017 |
| RU | 2015120954 | 12/2016 |

OTHER PUBLICATIONS

Shashi Roshan et al., Capturing Important Information From an Audio Conversation, Oct. 1, 2017, IEEE Uttar Pradesh Section International Conference on Electrical—Computer and Electronics, pp. 1-5 (Year: 2017).*
Tanmayce Behere et al., Text Summarization and Classification of Conversation Data Between Service Chatbot and Customer, Jul. 1, 2020, Fourth World Conference on Smart Trends in Systems—Security and Sustainability, pp. 834-838 (Year: 2020).*

* cited by examiner

Primary Examiner — Tam T Tran
(74) Attorney, Agent, or Firm — Weiss & Arons LLP

(57) ABSTRACT

Systems and methods for autofilling and autocorrecting an AI supported UI form text field via smart glasses are provided. The data autofillted and autocorrected may be identification data, including account numbers and user IDs. The smart glasses may work together with a conversation tracking application and a smart glasses UI. Methods may include prompting agents based on real-time conversational analysis with context clues and texts to assist and maintain customer eye contact. Methods may further include capturing segments of data within conversational analysis and storing the segments of data in memory on the smart glasses. Methods may further include updating smart glasses UI form text fields based on AI supported autocorrection from real-time conversation, by autofilling the segment of data in the smart glasses UI form text fields.

20 Claims, 6 Drawing Sheets

AI SUPPORTED UI FORM TEXT FIELD AUTOCORRECTING ITS VALUE FROM A LIVE CONVERSATION

FIELD OF TECHNOLOGY

Aspects of the disclosure relate to systems and methods for artificial intelligence ("AI") supported user interfaces ("UIs") using smart glasses technology.

BACKGROUND OF THE DISCLOSURE

Generally, bank agents use desktops, laptops, or tablets while interacting with customers face-to-face. Therefore, it is challenging for bank agents to maintain eye contact with customers while asking questions.

Bank agents' questions are typically predefined and part of a customer service process or flow. Some boiler-plate questions include: "May I have your full name?" "May I have your account number, please?" and "For verification purposes, may I have your date of birth?"

Bank agents ask these questions, obtain customers' responses, enter relevant contextual values from the customers' responses in UI forms, and pull additional information to move the calls forward. Relevant contextual values are values obtained from the context of a conversation that are relevant to the content within UI form text fields.

Bank agents typically look at screens while entering information and during this time, bank agents lose customer eye contact. This is a problem because customer-agent eye contact is important for optimal customer-agent engagement, interaction, satisfaction, and experience.

Currently, UI forms are designed to display information from UI applications or accept information for the UI applications via UI form text fields. But these UI form text fields do not hold any intelligence and are driven mostly by back-end code. And, because each text field is written and controlled by back-end code, any new addition or UI update requires back-end code changes. It would therefore be beneficial to be able to apply an AI application to UI form text fields. Such an application would automatically autofill, change, alter, autocorrect, and apply dynamic logic independent of updating back-end code.

The present disclosure solves the problem of lack of customer-agent eye contact and outlines an implementation of advanced technologies including, but not limited to, smart glasses, generative AI, context-based UI forms and fields, voice cloning, and customer-agent identification, to provide a touchless technology for agents to serve customers with eye contact and face-to-face interactions.

To that end, autocorrection is an aspect of the presently claimed disclosure. Accuracy and efficiency in autocorrecting text fields are desired in digital documentation. Therefore, accurate and efficient autocorrection applied to UI form text fields would be advantageous in digital documentation.

Digital documentation includes, for example, autofilling data and information into UI form text fields. Data and information, including, but not limited to, account number, phone number, customer identification ("ID"), and email ID, may be provided using a mouse or keyboard. Manually inputting data, however, may be tedious and time consuming. Furthermore, accuracy may degrade over time because of the repetitive nature of manually inputting data.

Smart glasses may be defined as wearable glasses that include both hardware and software components. Smart glasses may adopt the structure of a conventional pair of eyeglasses with a frame and lenses. A microprocessor may be embedded within the glasses and may provide processing capabilities.

It is desirable, therefore, to provide systems and methods that use AI supported UI form text fields to autofill data. Such data may be obtained from live conversations utilizing smart devices. For example, smart glasses or other smart wearables, with conversation tracking capabilities may be used. It is even further desirable to use smart glasses to track a conversation to perform specific actions, such as autofill, update, and autocorrect UI form text fields.

SUMMARY OF THE DISCLOSURE

Systems, methods, and apparatus for smart glasses with UI form text fields supported by AI are provided.

Smart glasses may include a frame supporting one or more lenses, a microprocessor embedded in the frame, a wireless communication interface embedded in the frame, a battery for powering the communication interface and the microprocessor, a sensor configured to capture a user eye position, and executable instructions stored in a non-transitory memory. Smart glasses may also be called a "smart glasses device."

The executable instructions when run by the microprocessor may capture a sequence of user eye positions with the sensor and transmit the sequence of user eye positions to a smart glasses interface using the wireless communication interface.

As a non-limiting example, a wearable device may be worn on an agent's face to communicate with a customer, track a conversation, and display UI form text fields on the wearable device. The conversation tracking device may be located, for example, on the smart glasses, or any smart device with a UI. The conversation tracking device may be a component or part of the smart glasses. The conversation tracking device may also be located separate from the smart glasses.

The smart glasses may include a micro recorder operable to capture data from the conversation and autofill into the UI form. The smart glasses may further include a memory unit for storing data captured from a conversation.

The smart glasses may also include a sensor configured to capture and recognize a user's voice. The smart glasses may further include a loop antenna configured to enable radio frequency communication.

The smart glasses may include a microprocessor operable to capture, store and transmit data to a receiver at a UI terminal.

Artificial intelligence supported UI form text fields carry more information and rule-based business logic compared to regular text fields which do not carry any logic or intelligence.

A user or agent, within an augmented reality ("AR") or virtual reality ("VR") environment may engage in conversation with a customer. The smart glasses may translate the conversation into actions within the AR/VR environment.

For example, a user or agent may maintain eye contact with the customer while interacting and holding a conversation. Simultaneously, smart glasses may autofill and autocorrect into an AI supported UI form text field using data and information gathered from a conversation. The smart glasses UI display may show the autofilling and autocorrection in real time. The smart glasses UI display may also provide contextual help to a user or agent for additional autofilling and autocorrection.

Another example of the present disclosure may include using smart glasses to track conversations, parse context, and autocorrect text field values in one or more digital documents based on the context parsed from the tracked conversations.

This disclosure provides smart glasses UI form text fields supported by advanced technologies including, but not limited to, AI, voice-to-text, natural language processing, context parsing, and speech-to-profile mapping. AI includes, but is not limited to, all forms of AI including large language models ("LLMs"), including, but not limited to ChatGPT, Bard, and the like. Voice-to-text conversion is the ability to take a voice and convert the audio to digital text images. Natural language processing is the ability to take natural language from a conversation and understand meaning and context from the natural language in the conversation. Context parsing is the ability to listen to a conversation and parse context and meaning out of the audio data obtained in a conversation. Speech-to-profile mapping is the ability to take a user or agent's voice and map a profile of the voice for future use.

A method is provided for an AI-based procedure to autofill and autocorrect UI form text fields based on contextual analyses of real-time conversations between a customer and an agent. In addition, the method may use AR display devices to autofill UI forms based on real-time conversations.

The present disclosure provides optimization of autofill and autocorrect functions for UI form text fields based on live voice conversations between a customer and an agent.

Provided herein are smart glasses configured for displaying data on a smart glasses UI. The smart glasses may autofill and autocorrect the displayed data from an AI supported conversation tracking application. The smart glasses may have a microphone operable to capture data from a conversation between an agent and a customer. And the smart glasses may have a sensor configured to capture, recognize, and clone an agent's voice.

When the sensor detects the voice of the agent, the microprocessor may be operable to execute a conversation tracking application. The conversation tracking application may be configured to determine one or more conversations between the agent and the customer. The conversation tracking application may extract data directed to a data entry field within the UI. Further, the conversation tracking application may detect data while listening to a conversation, and, in response to the detection, identify a data segment from the data within the data entry field.

A data capturing application may be configured to capture the data segment and an associated data entry field using the microphone. The data capturing application may then store the data segment and the associated data entry field in the memory of the smart glasses.

The smart glasses may be further configured with a light emitting diode ("LED"). The LED may be configured to transmit a data packet compiled at the smart glasses to the UI. A LiFi receiver may be configured to receive the data packet. And a processor may be configured to update a UI form text field by autofilling the data segment into its corresponding data entry field. The data segment may include identification data, which may include one or more account numbers and user IDs.

The smart glasses may include an AI supported conversation tracking device and a smart glasses UI. The smart glasses may display prompts on the smart glasses UI based on a live conversational analysis comprising one or more contextual notes, clues, and texts.

The smart glasses may capture a segment of data from a conversation. The smart glasses may store the segment of data in the memory on the conversation tracking smart glasses. The smart glasses may confirm an accuracy of the data segment in a data entry field on the smart glasses UI.

The smart glasses may update the UI form based on an AI supported autocorrection from a live conversation, by autofilling the segment of data in the UI form text field.

The smart glasses may store the data segment. The microprocessor may be configured to confirm an accuracy of the data segment. The microprocessor may instruct the smart glasses UI to display the data segment to a user of the smart glasses. The microprocessor may receive verification from the user of the smart glasses of the accuracy of the data segment. Following the verification, the microprocessor may store the data segment and the accuracy of the data segment in the memory of the smart glasses.

Also provided herein are one or more non-transitory computer-readable media storing computer-executable instructions on smart glasses. When executed, the instructions perform a method for displaying form text data entry fields to a LiFi enabled smart glasses UI. The method leverages an AI supported conversation tracking application via LiFi transmission.

The smart glasses may be positioned on an agent in conversation with a customer. The smart glasses may identify a conversation between the agent and the customer.

In response to the identification, the smart glasses may trigger a tracking of the conversation. The conversation tracking may begin from a first deliberate conversation gesture is identified. The conversation tracking may begin from a start point of the conversation. The conversation tracking may end when a second deliberate conversation gesture is identified. The conversation tracking may end at an endpoint of the conversation. A deliberate conversation gesture may be, e.g., a key word, phrase, expression, tone, or utterance.

The smart glasses may capture a data segment from the tracked conversation that matches a value of a dynamic UI form text field. The smart glasses may store the data segment in memory on the smart glasses. The smart glasses may transmit to the UI, using a LED, a data packet including the data segment stored in the memory, and an instruction to update the dynamic UI form text field to incorporate the data segment from the conversation. The smart glasses may update the UI based on the instruction by autofilling the data segment into a dynamic UI form text field. They smart glasses may transfer data including identification data including account numbers and user IDs.

Systems, methods, and apparatus are provided for smart glasses using an AI supported conversation tracking application, including a terminal supporting a smart glasses UI and a LiFi receiver. A terminal external to the smart glasses may be located within a threshold distance of the customer service area. The external terminal may be connected to a tablet, laptop, computer, or other smart device. Therefore, the dynamic UI form text fields from the smart glasses may be displayed on multiple devices without burdening the network.

The smart glasses may be configured to be worn on a face of an agent. The smart glasses may include a microphone operable to capture a conversation transcript between an agent and a customer. The smart glasses may include a memory for storing the captured conversation transcript between the agent and the customer.

The smart glasses may include one or more sensors configured to capture, recognize, and clone a voice of an agent.

The smart glasses may include a LED attached to a substrate on the smart glasses, the LED connected to a microcontroller. The microcontroller may be operable to flash or move the LED. The LED may be operable to transmit data to a terminal supporting the smart glasses UI. The terminal may be internal or external to the smart glasses. The terminal may be located at a threshold distance from the smart glasses. A microprocessor may be operable to capture, store, and transmit data to the LiFi receiver at the terminal.

The smart glasses, via the microprocessor, may be configured to execute a plurality of applications including executable instructions stored in a non-transitory memory on the smart glasses. The plurality of applications may include a conversation tracking application configured to identify a conversation between an agent and a customer.

The smart glasses may determine a data segment from the conversation associated with a dynamic UI form text field within the smart glasses UI form. The smart glasses may update the dynamic UI form text field with the data segment.

A LiFi data transfer engine may be configured to, using an LED, transmit a data packet compiled at the smart glasses to a terminal. The data packet may include a data segment associated with a dynamic UI form text field from the smart glasses. The data packet may also include an instruction to update the smart glasses UI to incorporate the data segment from the conversation, the LiFi receiver at the terminal is configured to receive the data packet.

A processor at a terminal may be configured to update the smart glasses UI by autofilling the data segment into the dynamic UI form text field. The data packet compiled at the smart glasses may include identification data such as account numbers and user IDs.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
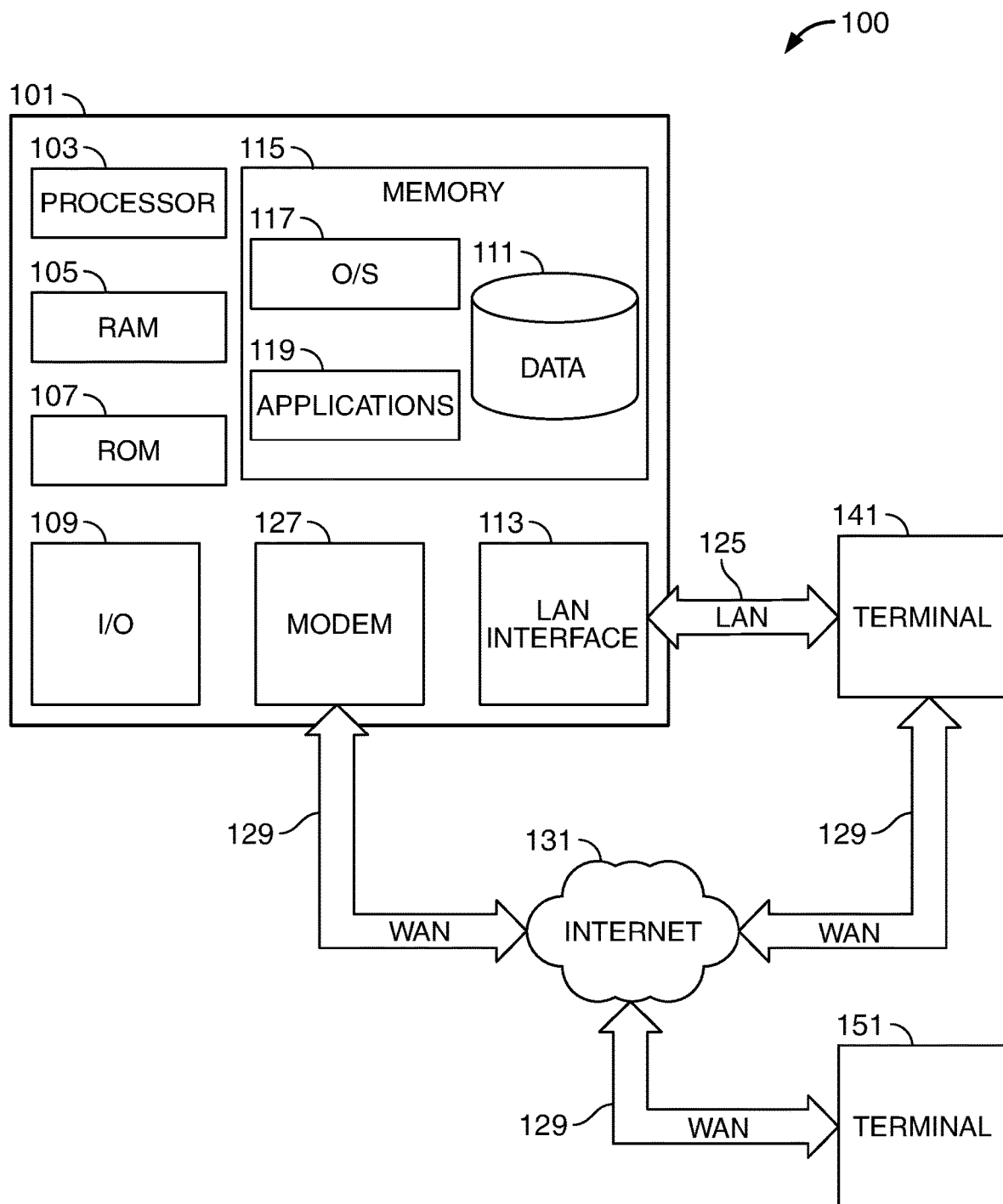
FIG. 1 shows an illustrative system in accordance with principles of the disclosure.

Systems, methods, and apparatus for smart UI form text field autocorrection is provided. The systems, methods, and apparatus may include a terminal supporting a UI, an AI supported conversation tracking application, and one or more smart devices. The one or more smart devices may be enabled to display data using light fidelity ("LiFi").

In this application, the terms "smart glasses" and "smart glasses device" may be used interchangeably with each other. Further, the terms "smart glasses" and "one or more smart glasses" may be used interchangeably with each other.

Each UI form may have extra data driven properties including, but not limited to, a conversation feed, a confidence index, a contextual conversation tree, and a state.

A conversation feed may be a transcript of a live conversation fed to a UI. Each text field on the UI form may receive a real-time conversation feed in the form of a real-time transcript. Each line in the transcript may be additionally tagged with a party ID (first party, second party, etc.). A party identification process may govern the selection of party ID. Each smart glasses UI form and UI form text field may track live conversations via conversation tracking application. The conversation tracking application may convert live conversations into live conversation data feeds. Each UI form may accept a live conversation data feed in AI mode and pass a corresponding conversation transcript feed to each of its UI form text fields.

A confidence index may be a probability value assigned to a data segment from a conversation based on its correlation with a UI form text field. The value of the confidence index may be between 0 and 100, i.e., minimum to maximum probability, respectively. If, during a live conversation, a UI form text field identifies a data segment with a higher probability of correlation, the text field may override the previously determined confidence index value with a new confidence index value.

A contextual conversation tree may be a hierarchical data tree filled with data items. Each of the data items in the contextual conversation tree may have several properties including, but not limited to, party ID (first, second, or third, etc.), type (request, response, etc.), and context extraction rule (e.g., if context is found, then may extract a 10-digit number, and assign a value). The contextual conversation tree may enable the UI form text fields to obtain contextual clues from a conversation and may convert the contextual clues into data segments to autofill into a UI form text field.

A state may describe the current state of each UI form text field including, but not limited to, active, inactive, and waiting for context extraction rule completion. An active state may mean a UI form text field is prepared or ready for data autofill. An inactive state may mean a text field is unable or unprepared to receive data autofill. A state of waiting for context extraction rule completion may mean the UI form text field may be ready for data autofill pending context extraction rule completion.

A contextual grouping of UI form text fields may be completed for an entire UI form. Each UI form and UI form text field may run its own state transition logic from an autofill conversation feed. Therefore, if multiple UI form text fields identify a section of a conversation matching their contextual conversation tree, they may share a confidence index value with each other. In addition, the UI form may identify a section of a conversation matching multiple UI form text fields' contextual conversation trees and may contextually group each UI form text field by sharing a confidence index value between them. This contextual grouping of UI form text fields may connect all the UI form text fields, such that if a confidence index value changes for one UI form text field, a confidence index value changes correspondingly at a second, grouped UI form text field.

Each of the contextual grouping of UI form text fields may have a grouped contextual conversation tree, which may be a grouped hierarchical data tree filled with data items. This may also be called a dependency group hierarchy tree.

Further, each UI form text field may have additional properties including party, field state, and contextual tree. Each UI form supporting each of the UI form text fields may have the same properties as the UI form text fields and may also be AI supported.

A party may identify a user, an agent, or a customer, for example, in a bank setting. Identifying each party is critical and there may be multi-party identification processes. For simplicity, however, consider a two-party identification process. For example, the first party may be a banking service agent, and the second party may be a customer. Speech recognition software may be used to create a banking service agent voice profile, which may be used to identify the first party ID in a conversation thread. Any speech other than the first party ID may then be considered for a second party ID.

In addition, each UI form may have a sharing confidence index (e.g., a grouping of pending UI form text fields). Some conversational context blocks are not so clear and may activate multiple UI form text fields together in listening mode, e.g.:

First party (agent): "May I know your account no. or phone no., please?"
Second party (customer): "It is 989-034-7889."

In this case, the UI form may have two UI form text fields: (1) account no. and (2) phone no. These two UI form text fields may partially match a conversational block. Therefore, a context parsing rule in both fields may suggest looking for a 10-digit numeric value in the second party's response. Because the smart glasses UI form, via a conversation tracking application, may find that the response partially matches two UI form text fields, the smart glasses UI form may split a confidence index between these two AI supported UI form text fields (e.g., 50-50 for each UI form text field, though it may vary from case-to-case, e.g., 20-80/30-70/40-60, etc.).

Later in the conversation data feed, the smart glasses UI form may identify an absolute value for the phone no. UI form text field, e.g.:

First party (agent): "Where do you want us to update the status?"
Second party (customer): "You can update me on my primary phone no. 343-809-5454."

This conversation block may give a higher confidence index to the phone no. UI form text field and the smart glasses UI form may update the phone no. UI form text field's current value with the new value parsed from the conservation's context. Simultaneously, the smart glasses UI form may dissociate the phone no. from the sharing confidence index group with the account no., which was created earlier in the feed. As the phone no. is dissociated from the sharing confidence index group, the entire confidence index value may then be allocated to the account no. UI form text field. And the previously identified value for the account no. UI form text field may be given a higher confidence index (e.g., 98%) as it nears finalization.

In the case of the second conversation block above, even though the current context obtained from the conversation is not an exact match for the account no. UI form text field, the smart glasses UI form may backtrack the dependency group hierarchy tree and autocorrect other UI form text field values and their corresponding confidence indices.

Each UI form and UI form text field may hold a data driven configuration that is dynamic with several states including, but not limited to, active, inactive, assigned, discard, and listening based on the live conversation data feed. In this way, UI forms and UI form text fields may toggle back and forth between states using AI support.

UI forms and UI form text fields may each have their own logic. A UI form may contain one or more UI form text fields. A UI form text field is a text field within a UI form. A UI form text field may also itself be a UI form, and vice versa. The active state means a UI form or UI form text field ready to receive data. The inactive state means a UI form or UI form text field that is not currently able to receive data. The assigned state means a UI form or UI form text field that is prepared and assigned to receive given data. The discard state means a UI form or UI form text field ready to discard or delete data or content. The listening based on the live conversation data feed state means a UI form or UI form text field ready to listen and convert a conversation data feed into contextual clues and data segments.

Multiple UI form text fields may be changed to an active state by the same conversation context. The states for these UI form text fields may be toggled back and forth from "active" to "listening" throughout the conversation.

A UI form or UI form text fields may create a confidence sharing group for activated UI form text fields. If multiple UI form text fields get activated from the same context of a conversation, the UI form may create several confidence sharing groups of UI form text fields during an entire listening session and may toggle between UI form text field states. Further, the UI form text fields may create a confidence sharing group and may toggle between states.

The UI form may also backtrack UI form text field confidence sharing groups if any of their respective UI form text fields obtain a higher confidence index during a customer-agent call. The UI form may then recalculate each confidence index of the other grouped UI form text fields.

An AI powered contextual form may be opened by the smart glasses, with default settings for "AI Mode" ON and "Show Context" ON. "AI Mode" and "Show Context" may also be set in the OFF position. "AI Mode" ON enables the AI powered contextual form to gather information from conversations. "Show Context" ON enables the AI powered contextual form to display to an agent contextual help texts, prompts, and clues to support a customer. "Show Context" ON may help a first party (e.g., banking agent) know what is understood from the conversation.

Switching the UI form to "Show Context" ON enables the first party (e.g., banking agent) to take the conversation in the direction of filling in any remaining, untouched, or inactive text fields. For example, based on the conversation, the smart glasses UI may display to an agent prompts such as "Get Details" or "Context: Let me get your details." These prompts may instruct an agent to ask the customer for specific details required to autofill any unfilled UI form text fields and to autocorrect any incorrectly filled UI form text fields.

Banking service agents may use smart glasses while interacting with one or more customers without any laptop, desktop, or any other data autofill device, keypad, or keyboard.

An agent may navigate a conversation in such a way that the AI contextual form can fill its required values, e.g.:

"May I know your account no. or phone no. to pull your details?"

Then the customer may reply with the information.

The smart glasses may keep recording and transcribing a conversation and pass a conversation data feed to an AI contextual UI form, which may pass the transcript to each UI form text field, and each UI form text field may toggle itself between various states.

An agent may see a UI form text field autofilling from their live conversation with a customer. The agent may say to the customer:

"OK, let me get your details."

This may trigger a prompt or an action button on the smart glasses UI form display, having a similar context configuration to the conversational context regarding the specific details required to autofill the UI form text field.

With this design, the agent may keep their eye contact with a customer throughout the call because they do not need to fill out and navigate software manually. Rather, each UI form text field is filled in automatically by an AI powered contextual form—i.e., an AI enabled UI form—on the smart glasses. In other words, UI form text fields on the smart glasses are filled in simultaneously and pursuant to the agent-customer conversation.

A pair of smart glasses may include one or more internal processors. The one or more internal processors may include one or more microprocessors. In addition to the processors, the smart glasses may also include hardware components associated with conventional devices. Smart glasses may also include one or more terminals. A terminal may include a LiFi receiver. A UI may also include a LiFi receiver.

A terminal for the purposes of the disclosure may include a computing device. The computing device may be independent from another computing device. The computing device may be a computer, iPad, laptop, tablet, mobile device, or any other suitable computing device.

Smart glasses may be configured for location on a user, customer, or agent. The smart glasses may be located within another smart device. And the smart glasses may also contain other smart devices. For the purposes of this disclosure, a smart device may be understood to mean any interactive device, including, but not limited to, smart glasses, smart computers, smart watches, smart phones, smart pads, smart screens, and smart user interfaces.

The smart glasses may include a microphone. The microphone may be operable to capture data from a conversation. The smart glasses may include a memory unit. The memory unit may be for storing the data captured from the conversation.

The smart glasses may include one or more sensors. The sensors may be configured to capture a conversation between an agent and a customer. Sensors may include the microphone. Sensors may also include vibration sensors, language sensors, and voice sensors. These micro electronic sensors may be configured to measure changes in vibration, tone, pitch, and sound. The smart glasses may be configured to use the measurements and translate them into control instructions. The smart glasses may include an antenna. The antenna may be a loop antenna. The antenna may be configured to enable radio frequency communication.

The smart glasses may include LiFi capabilities. The smart glasses may include a light emitting diode ("LED"). The LED may be attached to a substrate on the smart glasses. The LED may be connected to a microcontroller and/or a microprocessor. The LED may be operable to transmit the data captured from the conversation to a pair of smart glasses. The LED may be operable to transmit data captured to another UI. The LED may be operable to transmit data to any one or more additional computing devices.

LiFi is a two-way network protocol for high-speed connectivity using light technology. LiFi is a light-based communication system capable of transmitting data wirelessly at high-speed using light emitting diodes ("LEDs"). LiFi transmission speeds may be more than one hundred times faster than conventional WiFi. LiFi infrastructure is also relatively simple, in contrast with the radio transmitters and antennae required for WiFi communications. The speed of LiFi transfer may enable real-time parallel processing of large-scale files, vastly improving processing efficiency. The speed of LiFi transmission may also limit data leakage and thus protect against adversarial attacks during the data transmission process.

LiFi may capture data in modulated light frequencies. The driver-circuit in LED bulbs may encode and transmit data by switching the LED on and off at rates so fast that the flickering is indiscernible to the human conversation. The data may be decoded by an audio sensor on the receiving end and converted back into an electronic data stream.

LED bulbs may be dimmed to levels below human visibility while still emitting enough light to carry data. LiFi technology presents several advantages over conventional WiFi. One advantage is transmission speed. LiFi transfers may occur at speeds 100 times faster than conventional WiFi.

Another advantage is capacity. WiFi relies on the radio frequency spectrum which is subject to congestion and slowing due to high traffic. LiFi, on the other hand, uses the visible light spectrum which is 10,000 times larger than the radio bandwidth and is therefore not limited by spectrum capacity.

While WiFi frequencies may eventually become crowded and slower when large amounts of data are transferred, LiFi is able to deliver consistent large data transfers. Additionally, unlike WiFi, LiFi frequencies may be used in electromagnetic sensitive areas without causing interference. LiFi infrastructure is also relatively simple, in contrast with the radio transmitters and antennae required for WiFi communications.

The limited hardware required for LiFi communications also improves energy efficiency. Smart glasses may be exposed to light, mechanical movement, and electromagnetic conduction and may harvest energy from these sources.

The microprocessor may be operable to capture, store and transmit data to a receiver at a first terminal and a second terminal. One or more software modules may be executed on the microprocessor. The one or more software modules may be stored in a memory located within the smart glasses. The one or more software modules may, in the alternative, be referred to as applications. The applications may enable the smart glasses to execute various tasks.

The microprocessor may execute a conversation tracking application. Sensors may be controlled by the conversation tracking application executed on the smart glasses' microprocessor. Conversation data segments detected by the sensors may be collected by the conversation tracking application. Conversation data segments detected by the sensors may be stored in a memory embedded in the smart glasses. Sensors for tracking user conversation may include microphones.

The smart glasses may include multiple microphones per conversation for increased accuracy in measuring conversations. The smart glasses may include audio sensors to provide accuracy in conversation data segment extraction.

A smart glasses interface may display a potential UI form text field value in a side box and the user or agent may be prompted to obtain verification of UI form text field value. In some embodiments, the user or agent engages in UI form text field value verification steps.

The smart glasses may have a microprocessor that, prior to storing the data segment, may confirm the accuracy of the data segment. The microprocessor may instruct a display on the smart glasses to trigger an augmented reality display to a user of the smart glasses of the data segment. The microprocessor may receive a data segment verification from the user after identifying and parsing a conversation. And the microprocessor may store the data segment in the memory of the smart glasses.

A method may be provided for one or more non-transitory computer-readable media storing computer-executable instructions which, when executed by a processor, display form text fields to a LiFi enabled UI, leveraging smart glasses via LiFi transmission, the smart glasses positioned on an agent in conversation with a customer.

A method may be provided for detecting a conversation between the agent and the customer, triggering a tracking of the conversation in response to detecting a conversation between the agent and the customer, when a first deliberate conversation gesture is identified, tracking a start point of the conversation, and, when a second deliberate conversation gesture is identified, tracking an end point of the conversation.

A deliberate conversation gesture may be a prompt, including but not limited to, a greeting, phrase, word, or expression, including but not limited to, "Hello," "Hi," "Good day," "Goodbye," and "Bye."

A method may be provided for capturing a data segment within the start point of the conversation and the end point of the conversation. A method may be provided for storing the data segment in memory on the smart glasses. A method may be provided for transmitting the data segment to the UI, using a LED, a data packet including the data segment stored in the memory, and an instruction to update the UI to incorporate the data segment from the conversation. A method may be provided for updating the UI based on the instruction by autofilling the data segment into its corresponding data entry field.

A method may be provided for transferring data including, but not limited to, identification data including, but not limited to, account numbers and user IDs. A method may be provided for using smart glasses including a conversation tracking application connected to a smart glasses UI. A method may be provided for triggering context clues and texts to assist agents in maintaining eye contact with customers during and based on a live conversation. A method may be provided for capturing a segment of data within the conversational analysis and storing the segment of data in memory on the smart glasses. A method may be provided for updating the UI form based on an AI supported autocorrection from a live conversation, by autofilling the segment of data in the UI form text field.

A data entry system leveraging smart glasses is provided. The data entry system may include a terminal supporting a UI and a LiFi receiver, smart glasses configured to be worn on the face of an agent. The smart glasses may include a microphone operable to capture data from a conversation between the agent and a customer.

A data entry system may include a memory for storing the data captured from the conversation between the agent and the customer. A data entry system may include one or more sensors configured to capture and recognize the agent's voice. A data entry system may include a loop antenna configured to enable radio frequency communication.

A data entry system may include a LED attached to a substrate on the smart glasses. A data entry system may include a LED connected to a microcontroller, the microcontroller operable to move the LED, and the LED operable to transmit the data to the terminal supporting the UI.

A data entry system may include a microprocessor operable to capture, store, and transmit data to the LiFi receiver at the terminal. A data entry system may include smart glasses, via the microprocessor, configured to execute a plurality of applications comprising executable instructions stored in a non-transitory memory on the smart glasses.

A data entry system may include a plurality of applications including, but not limited to, a conversation tracking application configured to determine a conversation between an agent and a customer, determine a data segment from the conversation associated with a data entry field and a data entry field identifier within the UI, detect a deliberate conversation conveyance while listening to the conversation, and, in response to the detection, update the data entry field with the data segment.

A data entry system may include a LiFi data transfer engine configured to, using the LED, transmit a data packet compiled at the smart glasses to the terminal, the data packet including the data segment, the associated data entry field identifier from the smart glasses and an instruction to update the UI to incorporate the data segment from the conversation.

A data entry system may include a LiFi receiver at the terminal is configured to receive a data packet, and a processor at the terminal may be configured to update the UI by autofilling the data segment into the data entry field. A data entry system may include a data segment including, but not limited to, identification data, including, but not limited to, account numbers and user IDs.

A data entry system may include smart glasses including a conversation tracking application connected to a smart glasses UI. In an embodiment, a data entry system may include triggering context clues and texts to assist agents maintain eye contact with customers based on live conversational analysis. The data entry system may include capturing a segment of data within the conversational analysis and storing the segment of data in memory on the smart glasses. A data entry system may include updating the UI form based on an AI supported autocorrection from the live conversation, by autofilling the segment of data in the UI form text field.

A digital signal processor ("DSP") may be located on a remote server. The smart glasses and/or its components may communicate with the remote server using Wi-Fi, LAN, WAN, internet connectivity, cellular networks, and/or 5G networks. Using 5G networks and communication protocols may enable faster processing of transaction requests.

A conversation tracking application may utilize machine learning and deep-learning algorithms, such as, e.g., convolutional neural networks and random forest, to track and translate conversations into actions, texts, letters, numbers, and/or symbols.

A communication circuit may be configured to transmit and receive data including the digital data, conversations, words, numerals, and symbols. In alternative embodiments, the communication circuit may include a network interface card ("NIC"), a Bluetooth antenna, a cellular antenna, a wi-fi antenna, or any other appropriate antenna. A 5G-capable cellular antenna and communication circuit may be preferable to increase the speed of smart glasses communication.

The digital data transfer (in both directions) may be sent over any suitable communications network, including 5G cellular networks.

Illustrative embodiments of apparatus and methods in accordance with the principles of the disclosure will now be described with reference to the accompanying drawings, which form a part hereof. It is to be understood that other embodiments may be utilized, and structural, functional, and procedural modifications may be made without departing from the scope and spirit of the present disclosure.

The drawings show illustrative features of apparatus and methods in accordance with the principles of the disclosure. The features are illustrated in the context of selected embodiments. It will be understood that features shown in connection with one of the embodiments may be practiced in accordance with the principles of the disclosure along with features shown in connection with another of the embodiments.

Apparatus and methods described herein are illustrative. Apparatus and methods of the disclosure may involve some or all of the features of the illustrative apparatus and/or some or all of the steps of the illustrative methods. The steps of the methods may be performed in an order other than the order shown or described herein. Some embodiments may omit steps shown or described in connection with the illustrative methods. Some embodiments may include steps that are not shown or described in connection with the illustrative methods, but rather shown or described in a different portion of the specification.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

FIG. 1 shows an illustrative block diagram of system 100 that includes computer 101. One may refer to Computer 101 as an "engine," "server," or "computing device." Computer 101 may be a workstation, desktop, laptop, tablet, smart phone, or any other suitable computing device. One may use elements of system 100, including computer 101, to implement various aspects of the systems and methods disclosed herein.

Computer 101 may have processor 103 for controlling operation of the device and its associated components, and may include RAM 105, ROM 107, autofill/output module 109, and non-transitory/non-volatile machine-readable/writeable memory 115. One may configure machine-readable/writeable memory to store information in machine-readable/writeable data structures. Processor 103 may also execute all software running on the computer—e.g., an operating system and/or voice recognition software. Other components commonly used for computers, such as EEPROM or Flash memory or any other suitable components, may also be part of computer 101.

Memory 115 may be made up of any suitable permanent storage technology—e.g., a hard drive. Memory 115 may store software including operating system 117 and application program(s) 119 along with any data 111 needed for operation of system 100. Memory 115 may also store videos, text, and/or audio assistance files. One may store data in memory 115, in cache memory, or in any other suitable memory.

Autofill/output ("I/O") module 109 may include connectivity to a microphone, keyboard, touch screen, mouse, and/or stylus. One may provide autofill into computer 101 through these I/O modules. The autofill may include autofill relating to cursor movement. I/O 109 may also include one or more speakers for providing audio output and a video display device for providing textual, audio, audiovisual, and/or graphical output. The autofill and/or output may be related to computer application functionality.

One may connect System 100 to other systems via local area network ("LAN") interface (or adapter) 113. System 100 may operate in a networked environment supporting connections to one or more remote computers, such as terminals 141 and 151. Terminals 141 and 151 may be personal computers or servers that include many or all the elements described above relative to system 100. Network connections depicted in FIG. 1 include a LAN 125 and a wide area network ("WAN") 129 but may also include other networks. One may connect computer 101 to LAN 125 through LAN interface (or adapter) 113 when using a LAN networking environment. When used in a WAN networking environment, computer 101 may include modem 127 or other means for establishing communications over WAN 129, such as Internet 131.

One appreciates that the network connections shown are illustrative. One may use other means of establishing a communications link between computers. One may presume the existence of various well-known protocols such as TCP/IP, Ethernet, FTP, HTTP, and the like. One may operate the system in a client-server configuration to permit retrieval of data from a web-based server or application programming interface ("API"). One may understand that web-based, for this application, includes a cloud-based system. The web-based server may transmit data to any other suitable computer system. The web-based server may also send computer-readable instructions, together with data, to any suitable computer system. The computer-readable instructions may be to store data in cache memory, the hard drive, secondary memory, or any other suitable memory.

Additionally, one may use application program(s) 119 on computer 101. These programs may include computer executable instructions for invoking functionality related to communication, such as e-mail, Short Message Service ("SMS"), and voice autofill and speech recognition applications. One may refer to application program(s) 119 (alternatively, "plugins," "applications," or "apps") to include computer executable instructions for invoking functionality related to performing various tasks. Application program(s) 119 may utilize one or more algorithms that process received executable instructions, perform power management routines or other suitable tasks. Application program(s) 119 may utilize one or more decisioning processes for the processing of real-time customer interactions as detailed herein.

Application program(s) 119 may include computer executable instructions (alternatively referred to as "programs"). Embodied in hardware or firmware (not shown) may be the computer executable instructions. Computer 101 may execute the instructions embodied by the application program(s) 119 to perform various functions.

Application program(s) 119 may utilize the computer-executable instructions executed by a processor. Programs include routines, programs, objects, components, data structures, etc. that perform tasks or implement abstract data types. A computing system may be operational with distributed computing environments. Remote processing may perform tasks on devices linked through a communications network. In a distributed computing environment, a program may be in both local and remote computer storage media including memory storage devices. Computing systems may rely on a network of remote servers hosted on the Internet to store, manage, and process data (e.g., "cloud computing" and/or "fog computing").

Stored in memory 115 is any information described above in connection with database 111, and any other suitable information. One or more of application program(s) 119 may include one or more algorithms used to add data and metadata to a database, identify a type of form being used, predict fields in a document, identify changes between documents, provide changes to an entity to ascertain if an error is present, identify fraud concerns, communicate fraud concerns to interested parties within an organization, and provide documents for providing to a regulatory authority.

One may describe the disclosure in the context of computer-executable instructions, such as application program (s) 119, for execution by a computer. Programs may include routines, programs, objects, components, and data structures, which perform tasks or implement data types. One may practice the disclosure in distributed computing environments. One may perform tasks by remote processing devices, linked through a communications network. In a distributed computing environment, programs may be in both local and remote computer storage media including memory storage devices. One may consider such programs, for this application's purposes, as engines for the performance of the program-assigned tasks.

Computer 101 and/or terminals 141 and 151 may also include various other components, such as a battery, speaker, and/or antennas (not shown). One may link components of computer system 101 by a system bus, wirelessly or by other suitable interconnections. Components of computer system 101 may be present on one or more circuit boards. In some embodiments, the components may be integrated into a single chip. The chip may be silicon-based.

Terminal 151 and/or terminal 141 may be portable devices such as a laptop, cell phone, Blackberry™, tablet, smartphone, or any other computing system for receiving, storing, transmitting and/or displaying relevant information. Terminal 151 and/or terminal 141 may be one or more user devices. Terminals 151 and 141 may be identical to system 100 or different. The differences may be related to hardware components and/or software components.

The disclosure may be operational with numerous other general purpose or special purpose computing system environments or configurations. Examples of well-known computing systems, environments, and/or configurations that may be suitable for use with the disclosure include, but are not limited to, personal computers, server computers, handheld or laptop devices, tablets, mobile phones, smart phones and/or other personal digital assistants ("PDAs"), multiprocessor systems, microprocessor-based systems, cloud-based systems, programmable consumer electronics, network PCs, minicomputers, mainframe computers, distributed computing environments that include any of the above systems or devices, and the like.

Figure 2:
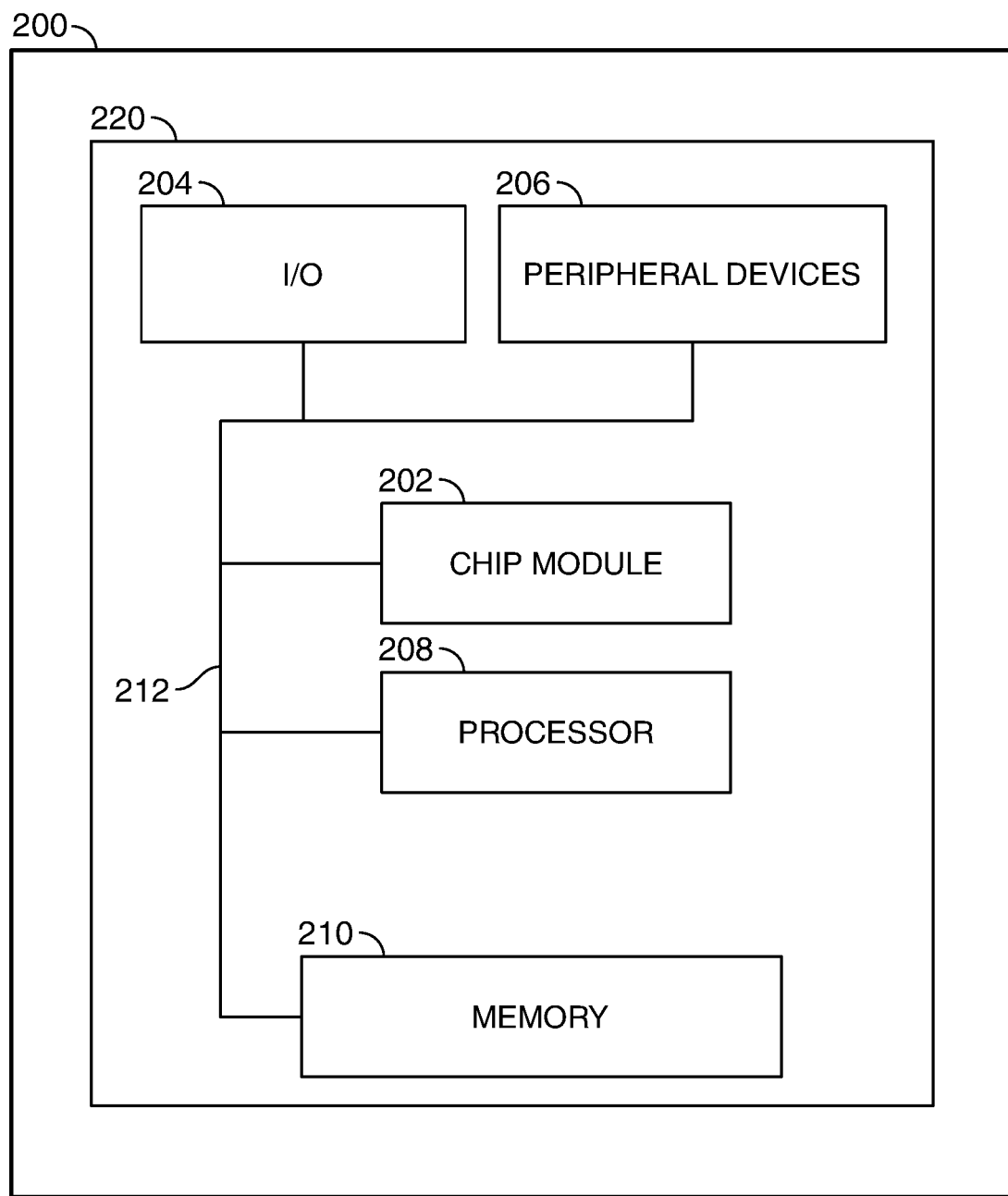
FIG. 2 shows an exemplary diagram in accordance with principles of the disclosure.

FIG. 2 shows an illustrative block diagram of apparatus 200. One may configure apparatus 200 in accordance with the principles of the disclosure. Apparatus 200 may be a computing device. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real time timers, power-on reset generators or any other suitable peripheral devices; logical processing device 208, which may compute data structural information and structural parameters of data; and machine-readable/writeable memory 210.

One may configure machine-readable/writeable memory 210 to store information in machine-readable/writeable data structures, such as: machine executable instructions (for example, "computer instructions" or "computer code"); applications, signals; and/or any other suitable information or data structures.

One may couple together components 202, 204, 206, 208 and 210 by system bus (or other interconnections) 212 and may be present on one or more than one circuit board 220. In some embodiments, the components may be integrated into a single chip. The chip may be silicon-based.

Figure 3:
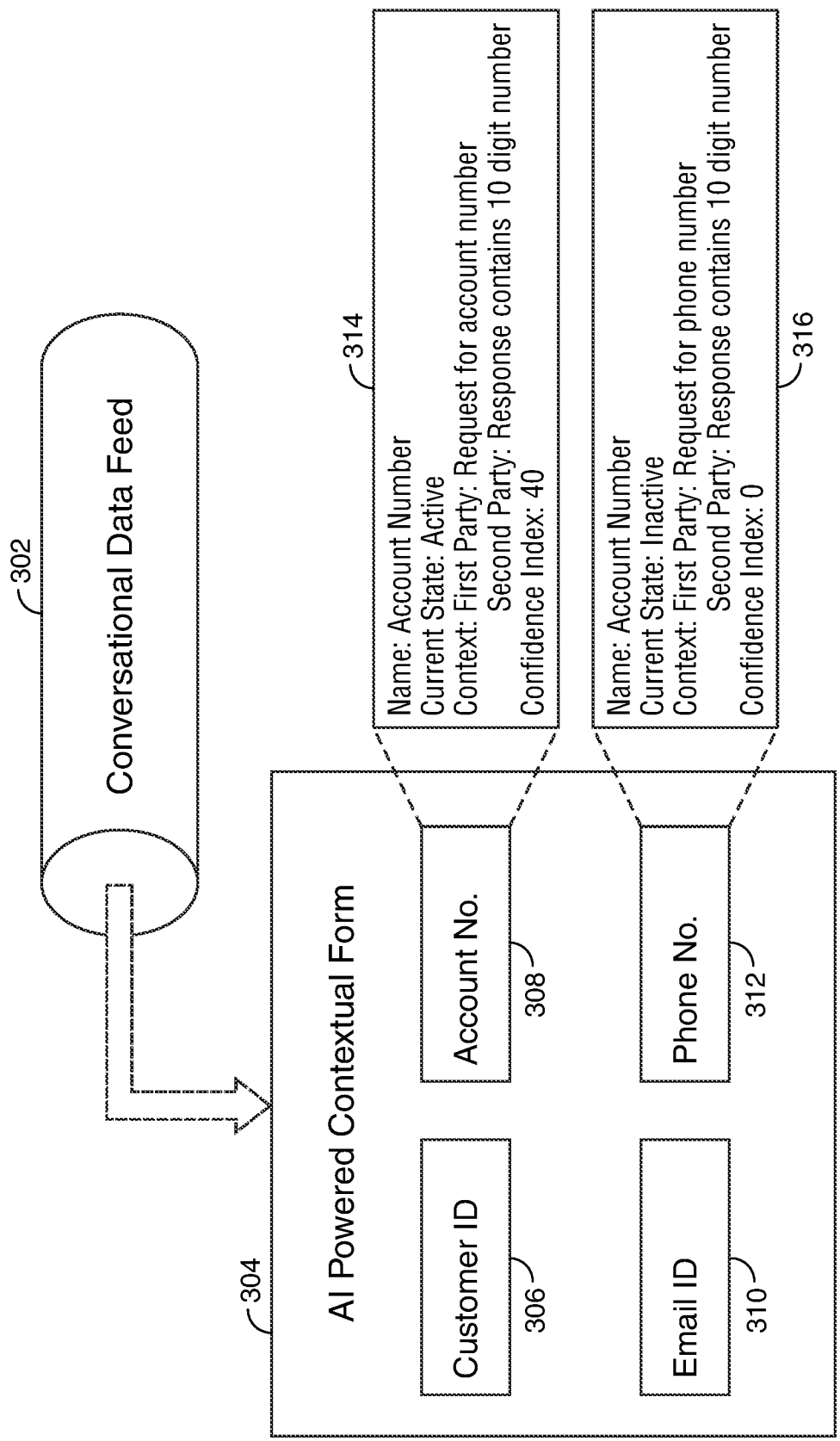
FIG. 3 shows an illustrative diagram in accordance with principles of the disclosure.

FIG. 3 shows an illustrative process schematic of a party, field state, and contextual tree. FIG. 3 contains both illustrative steps and numbered components.

Conversational data feed 302 is provided from a conversation between a company agent and a customer. Conversational data feed 302 feeds a transcript of a conversation to each of the UI form text fields in AI powered contextual form 304 including, but not limited to, customer ID text field 306, account no. text field 308, email ID text field 310, and phone no. text field 312.

Side UI form text box 314 shows some extra data driven property aspects of UI form text field account no. 308. And side UI form text box 316 shows some extra data driven property aspects of UI form text field phone no. 308.

As an example, the account no. text field 308 may be given context from the conversational data feed 302 including, but not limited to (seen inside UI form text box 314):

"First Party: Request for account number."

"Second Party: Response contains a 10-digit number."

The confidence index may be the percentage probability that the data provided for the given form text field is correct. For example, a "Confidence Index: 40" means that there is a 40% chance that the assigned values are correct for UI form text field 308.

As another example, the phone no. text field 312 may be given context from the conversational data feed 302 including, but not limited to (seen inside UI form text box 316):

"First Party: Request for phone number."

"Second Party: Response contains a 10-digit number."

Here, a "Confidence Index: 0" means that there is a 0% chance that the assigned values are correct for the given form text field.

Figure 4:
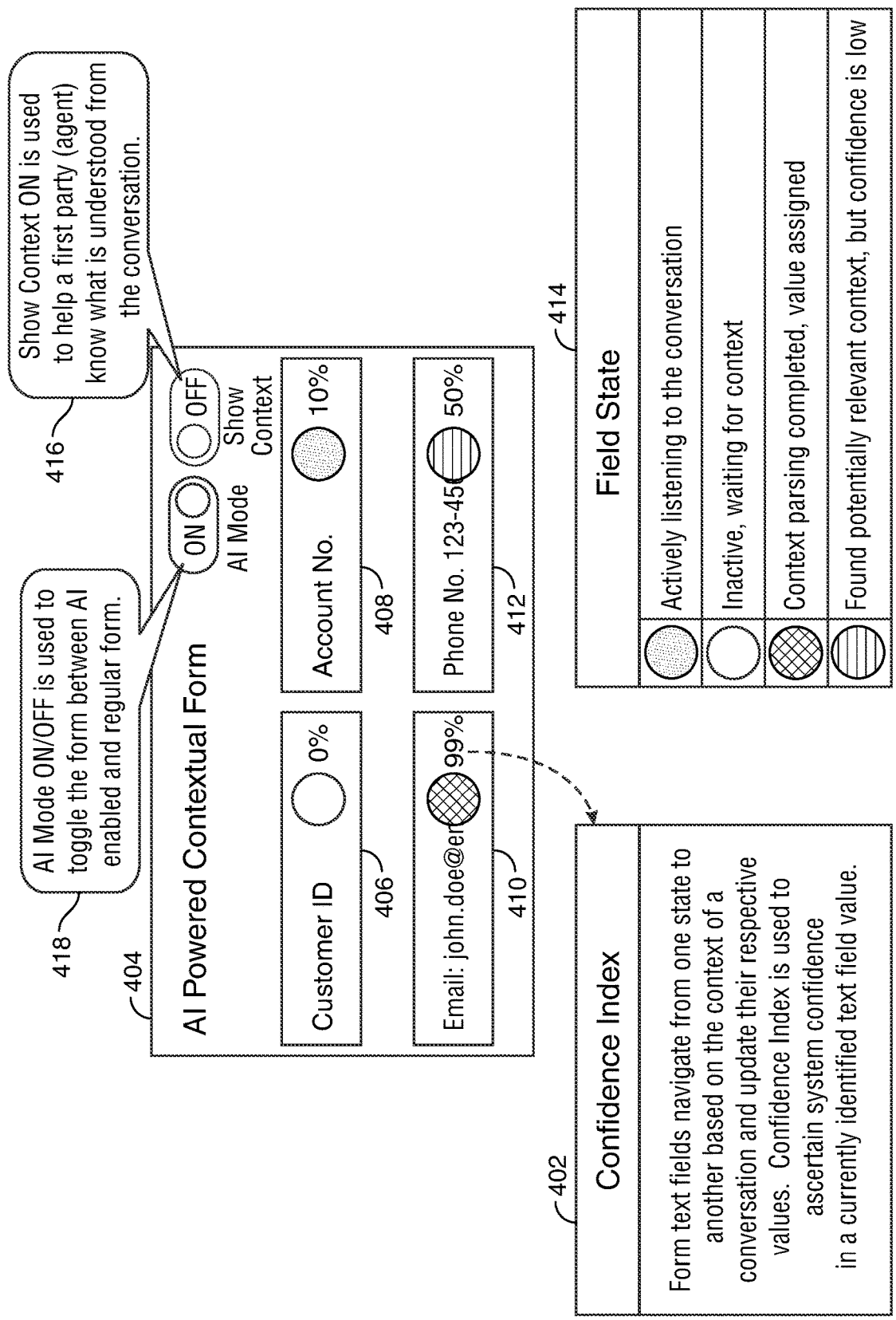
FIG. 4 shows illustrative systems and methods in accordance with principles of the disclosure.

FIG. 4 shows an illustrative embodiment of AI supported UI form and text field attributes, in accordance with the principles of the disclosure.

The AI powered contextual form 404 may include customer ID text field 406 (with 0% confidence index), account no. text field 408 (with 10% confidence index), email ID text field 410 (with 99% confidence index), and phone no. text field 412 (with 50% confidence index). A 99% confidence index may be considered a valid entry value. The UI form and its fields may toggle from one state to another based on the context of the conversation and keep their respective values updated. Confidence Index 402 measures how confident the system is about the currently identified value for a given text field.

In addition, a field state 414 may be displayed for each UI form text field. The field state 414 may include, for example, a color-coded or pattern-coded system for identifying conversational context. For example, one color or pattern may represent smart glasses are "actively listening to the conversation," one color or pattern may represent smart glasses are "inactive, waiting for context," one color or pattern may represent smart glasses when "context parsing completed, value assigned," and another color or pattern may represent when smart glasses "found potentially relevant context, but confidence is low."

A 99% confidence index may be considered "context parsing completed, value assigned." A 50% confidence index may be considered "found potentially relevant context, but confidence is low." A 10% confidence index may be considered "actively listening to the conversation." A 0% confidence index may be considered "inactive, waiting for context."

It may be beneficial for an agent to see the context of a conversation and correlate the conversation context with UI form text field values. In addition, the UI form may prompt an agent with context to ask a customer for each UI form text field and this information may help the agent direct the conversation further.

In an embodiment, AI Mode 418 may be toggled ON or OFF. AI Mode ON/OFF 418 is used to toggle the UI form between an AI enabled (AI Mode ON) and a regular mode (AI Mode OFF). Further, Show Context 416 made be toggled ON or OFF, as well. Show context ON 416 may help a first party (agent) know what is understood from a conversation.

Figure 5:
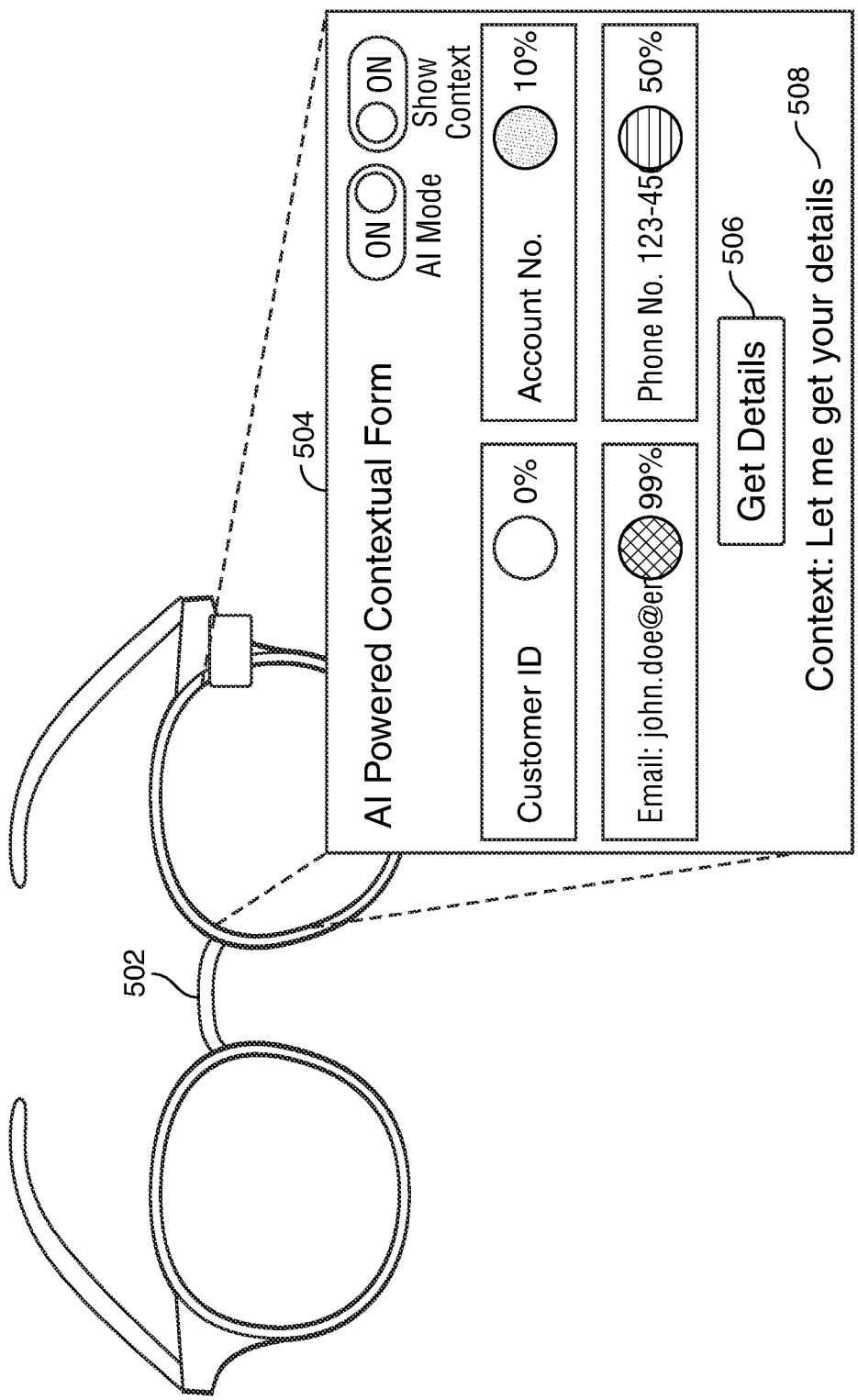
FIG. 5 shows illustrative systems and methods in accordance with principles of the disclosure.

FIG. 5 shows an illustrative method use case in accordance with the principles of the disclosure.

In an embodiment, smart glasses 502 are a representative pair of smart glasses. Smart glasses 502 may have one or more features in common with the smart glasses of the claimed embodiments.

Smart glasses 502 may display the AI powered contextual form 504. The AI powered contextual form may include AI Mode ON/OFF, Show Context ON/OFF, and text fields for Customer ID, Account No., Email ID, and Phone No.

Further, contextual clues and text may appear on the smart glasses UI form 504. For example, the agent wearing smart glasses 502 may receive a prompt that says, "Get Details," 506. Based on this prompt, a context clue or text: "Context: Let me get your details," 508 may appear on the smart glasses UI.

Figure 6A:
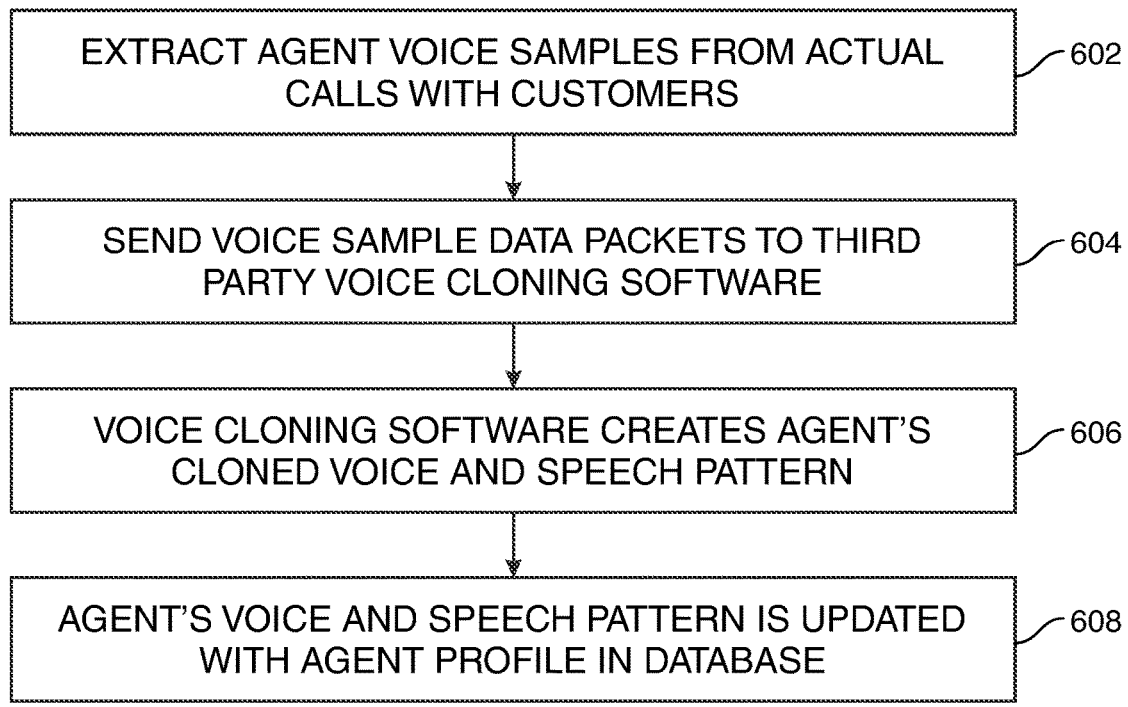
FIG. 6A shows illustrative systems and methods for agent voice extraction and cloning in accordance with principles of the disclosure.

FIG. 6A shows a schematic flowchart of a method for agent voice extraction and cloning. FIG. 6A contains numbered components.

At step 602, a pair of smart glasses extracts a set of agent voice samples from realt-time calls with customers. Then, at step 604, the smart glasses send voice sample data packets to third party voice cloning software. Following, at step 606, the third-party voice cloning software creates the agent's cloned voice and speech patterns. Finally, at step 608, the agent's voice and speech patterns are updated with the agent profile in a database.

Figure 6B:
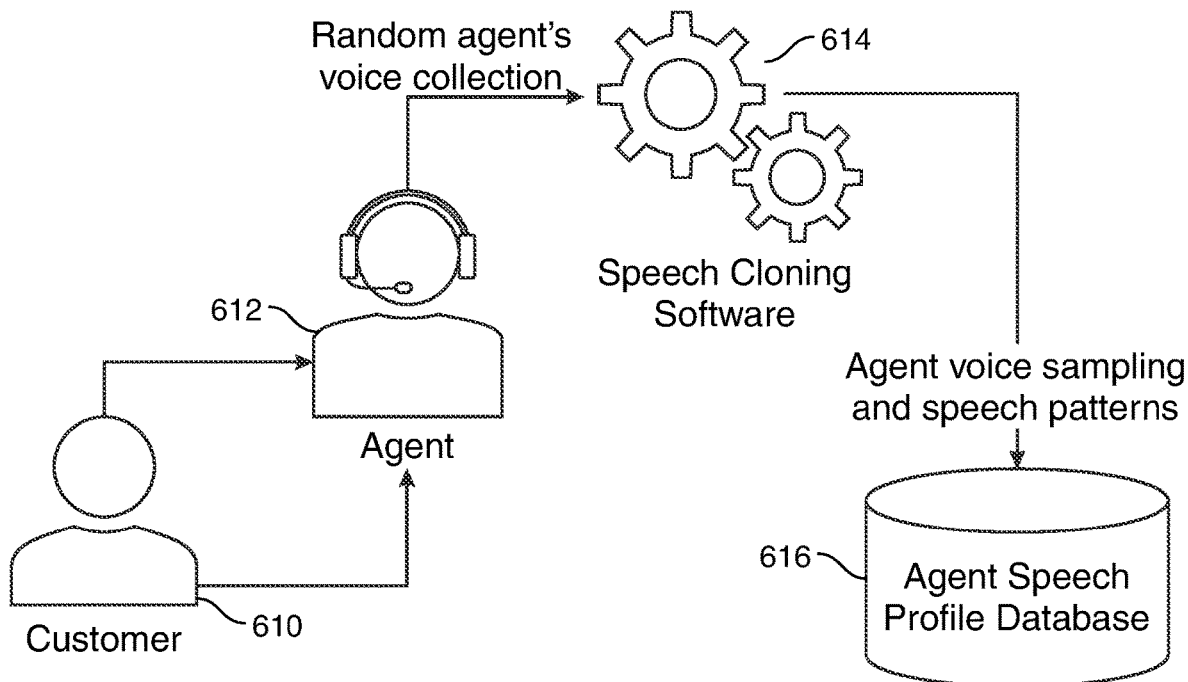
FIG. 6B shows yet another illustrative system and method for agent voice extraction cloning in accordance with principles of the disclosure.

FIG. 6B shows an illustrative process schematic of a method for agent voice extraction cloning. FIG. 6B contains both illustrative steps and numbered components.

Customer 610 is engaged in a conversation with agent 612. The smart glasses worn by agent 612 is engaged in a random agent's voice collection. The agent is random because it could be any user or agent. The agent's voice data is collected by Speech Cloning Software 614, third party software. The Speech Cloning Software 614 analyzes and decodes the agent's voice sampling and speech patterns. The agent's voice sampling and speech patterns are then stored in an Agent Speech Profile Database 616 for storage, analysis, recreation, and future voice extraction and cloning. The Speech Cloning Software 614 may be used, for example, for agent or user authentication or for AI voice replication purposes.

The smart glasses may have one or more computer systems and servers that include one or more of the following hardware components: I/O circuitry, which may include a transmitter device and a receiver device and may interface with fiber optic cable, coaxial cable, telephone lines, wireless devices, physical network layer hardware, a keypad/display control device or any other suitable encoded media or devices; peripheral devices, which may include counter timers, real-time timers, power-on reset generators or any other suitable peripheral devices; a logical processing device, which may compute data structural information, structural parameters of the data, quantify indices, and machine-readable memory. The source database may be part of a computer system. The target database may be part of a computer system. Each hardware component may be a "micro" version. Processors, receivers, transmitters, sensors and cameras and any other suitable hardware may be "micro." These same hardware components may also not be "micro."

The smart glasses may include RAM, ROM, an autofill/output ("I/O") module and a non-transitory or non-volatile memory. Machine-readable memory may store information in machine-readable data structures. The I/O module may include a microphone, button and/or touch screen which may accept user-provided autofill. The I/O module may include a speaker for providing audio output and/or a video display for providing textual, audio, and/or graphical output.

Software applications executed by the smart glasses may be stored within the non-transitory memory and/or other storage medium. Software applications may provide instructions to the processor that enable the apparatus to perform various functions. The instructions may include any of the smart glasses methods and processes described herein. For example, the non-transitory memory may store software applications such as the conversation movement tracking module and data capture module. Alternatively, some or all of computer executable instructions of a software application may be embodied in hardware or firmware components of a computer system or server.

Software applications may include computer executable instructions for invoking user functionality related to communication, such as email, short message service ("SMS"), and voice autofill and speech recognition applications. Software application programs may utilize one or more algorithms that process received executable instructions, perform power management routines or other suitable tasks.

Software applications may utilize computer-executable instructions, such as program modules, executed by a processor. Generally, program modules include routines, programs, objects, components, data structures, etc. that perform tasks or implement particular abstract data types. A computing system may be operational with distributed computing environments where tasks are performed by remote processing devices that are linked through a communications network. In a distributed computing environment, program modules may be in both local and remote computer storage media including memory storage devices. Computing systems may rely on a network of remote servers hosted on the Internet to store, manage, and process data (e.g., "cloud computing" and/or "fog computing").

The smart glasses may be part of two or more networks. The smart glasses may support establishing network connections to one or more remote computing systems. Illustrative network connections may include a LAN and a WAN. When used in a LAN networking environment, a computing system may be connected to the LAN through a network interface or adapter. A computing system may include a communication circuit. The communication circuit may include a network interface card or adapter.

When used in a WAN networking environment, the smart glasses and the remote server may include a modem, antenna, or other circuitry for establishing communications over a WAN, such as the Internet. The communication circuit may include a modem and/or antenna.

The existence of any of various well-known protocols such as TCP/IP, Ethernet, FTP, HTTP and the like is presumed, and a computing system may be operated in a client-server configuration to permit a user to retrieve web pages from a web-based server. Web browsers can be used to display and manipulate data on web pages.

Computer systems and servers may include components, such as a display, battery, speaker, transceivers, and antennas. Components of a computer system and server may be linked by a system bus, wirelessly or by other suitable interconnections. Components of a computer system and server may be present on one or more circuit boards.

Thus, methods and apparatus for autocorrecting UI forms using smart glasses are provided. The present disclosure may be practiced by any means other than the described embodiments, which are presented for purposes of illustration rather than of limitation, and that the present disclosure is limited only by the claims that follow.

What is claimed is:

1. Smart glasses configured for displaying data on a smart glasses user interface ("UI"), by autofilling and autocorrecting the data from an artificial intelligence ("AI") supported conversation tracking application, the smart glasses comprising:
    a microphone operable to capture data from a conversation between an agent and a customer;
    a memory for storing the data captured from the conversation between the agent and the customer;
    a sensor configured to capture, recognize, and clone a voice of an agent;
    a microprocessor operable to capture, store, and transmit data;
wherein, when the sensor detects the voice of the agent, the microprocessor is operable to:
    execute the AI supported conversation tracking application configured to:
        identify one or more conversations between the agent and the customer,
        detect data while tracking a conversation;
        in response to the detection, match an extracted data segment from the conversation to a dynamic UI form text field;
        store the extracted data segment in the memory of the smart glasses; and
        update the dynamic UI form text field by autofilling the data segment into the dynamic UI form text field.

2. The smart glasses of claim 1, wherein the data segment comprises identification data comprising one or more account numbers and user IDs.

3. The smart glasses of claim 1, wherein the smart glasses UI comprises the AI supported conversation tracking application.

4. The smart glasses of claim 1, wherein the smart glasses are configured to display a prompt on the smart glasses UI based on a real-time conversational analysis, wherein the prompt comprises one or more contextual notes.

5. The smart glasses of claim 1, wherein the smart glasses are configured for the agent to verify an accuracy of the data segment matching the dynamic UI form text field on the smart glasses UI.

6. The smart glasses of claim 5, wherein the smart glasses are configured to update the dynamic UI form text field based on AI supported autocorrection from the real-time conversation, by autofilling the segment of data in the dynamic UI form text field.

7. The smart glasses of claim 1, wherein prior to storing the data segment, the microprocessor is configured to verify an accuracy of the data segment matching the dynamic UI form text field, the verification comprising:
    instructing the smart glasses UI to display the data segment to a user of the smart glasses;
    receiving verification from the user of the smart glasses of the accuracy of the data segment; and
    following the verification, storing the data segment and the accuracy of the data segment in the memory of the smart glasses.

8. One or more non-transitory computer-readable media storing computer-executable instructions on smart glasses which, when executed by a processor, perform a method for displaying a form text field to a LiFi enabled smart glasses UI, using an AI supported conversation tracking application via LiFi transmission, the smart glasses positioned on an agent, the method comprising:
    identifying a conversation between the agent and a customer;
    in response to the identification, triggering a tracking of the conversation;
    when a first deliberate conversation gesture is identified, tracking from a start point of the conversation;
    when a second deliberate conversation gesture is identified, tracking to an end point of the conversation;
    capturing a data segment within the start point of the conversation and the end point of the conversation;
    storing the data segment in memory on the smart glasses; and
    updating the smart glasses UI by autofilling the data segment into a dynamic UI form text field.

9. The method of claim 8, further comprising transmitting a data packet from the smart glasses to a terminal located within a threshold distance of the smart glasses, the data packet comprising:
    the data segment stored in the memory; and
    an instruction to update the smart glasses UI to incorporate the data segment from the conversation;
and updating the smart glasses UI based on the instruction by autofilling the data segment into a dynamic UI form text field.

10. The method of claim 8, wherein the smart glasses transfer data comprising identification data comprising one or more account numbers and user IDs.

11. The method of claim 8, wherein the smart glasses UI comprises the AI supported conversation tracking application.

12. The method of claim 8, wherein the smart glasses display a prompt on the smart glasses UI based on a real-time conversational analysis, wherein the prompt comprises one or more contextual notes.

13. The method of claim 8, wherein the smart glasses capture a segment of data within a conversation, store the segment of data in the memory on the smart glasses, and verify an accuracy of the data segment in the dynamic UI form text field on the smart glasses UI.

14. The method of claim 13, wherein the smart glasses update the smart glasses UI form text field based on AI supported autocorrection from a real-time conversation, by autofilling the segment of data in the smart glasses UI form text field.

15. A system using smart glasses, the system comprising:
a terminal supporting a smart glasses UI and a LiFi receiver;
the smart glasses configured to be worn on a face of an agent comprising:
   a microphone operable to capture data from a conversation between the agent and a customer;
   a memory for storing the data captured from the conversation between the agent and the customer;
   one or more sensors configured to capture, recognize, and clone a voice of the agent;
   a loop antenna configured to enable radio frequency communication;
   a LED attached to a substrate on the smart glasses, the LED connected to a microcontroller, the microcontroller operable to flash the LED, and the LED operable to transmit the data to the terminal supporting the smart glasses UI;
   a microprocessor operable to capture, store, and transmit data to the LiFi receiver at the terminal;
wherein the smart glasses, via the microprocessor, is configured to execute a plurality of applications comprising executable instructions stored in a non-transitory memory on the smart glasses, the plurality of applications comprising:
   an AI supported conversation tracking application configured to:
      identify a conversation between an agent and a customer;
      determine a data segment from the conversation associated with a dynamic UI form text field within the smart glasses UI;
      and
      update the dynamic UI form text field with the data segment.

16. The system of claim 15, further comprising a LiFi data transfer engine configured to, using the LED, transmit a data packet compiled at the smart glasses to a terminal located within a threshold distance of the smart glasses,
the data packet comprising:
   the data segment,
   the dynamic UI form text field from the smart glasses, and
   an instruction to update the smart glasses UI to incorporate the data segment from the conversation at the dynamic UI form text field;
the LiFi receiver at the terminal is configured to receive the data packet; and
a processor at the terminal is configured to update the smart glasses UI by autofilling the data segment into the dynamic UI form text field,
wherein the data packet compiled at the smart glasses comprises identification data, wherein the identification data comprises account numbers and user IDs.

17. The system of claim 15, wherein the smart glasses UI comprises the AI supported conversation tracking application.

18. The system of claim 15, wherein the smart glasses display a prompt on the smart glasses UI based on a real-time conversational analysis, wherein the prompt comprises one or more contextual notes.

19. The system of claim 15, wherein the smart glasses capture a segment of data within a conversation, store the segment of data in the memory on the smart glasses, and verify an accuracy of the data segment in the dynamic UI form text field on the smart glasses UI.

20. The data entry system of claim 19, wherein the smart glasses update the smart glasses UI form text field based on AI supported autocorrection from a real-time conversation, by autofilling the segment of data in the dynamic UI form text field on the smart glasses UI.

* * * * *